United States Patent
Fraidlin et al.

(12) 
(10) Patent No.: US 6,259,235 B1
(45) Date of Patent: Jul. 10, 2001

(54) ACTIVE CLAMP FOR POWER CONVERTER AND METHOD OF OPERATION THEREOF

(75) Inventors: Simon Fraidlin, Plano; Anatoliy Polikarpov, Mesquite, both of TX (US)

(73) Assignee: Tyco Electronics Logistics AG, Steinach/SG (CH)

( * ) Notice: Subject to any disclaimer, the term of this patent is extended or adjusted under 35 U.S.C. 154(b) by 0 days.

(21) Appl. No.: 09/383,322

(22) Filed: Aug. 26, 1999

(51) Int. Cl.[7] .............................. H02H 7/125; G05F 1/10; G05F 1/652
(52) U.S. Cl. ........................ 323/222; 323/282; 323/290; 363/53
(58) Field of Search ................................ 323/222, 282, 323/224, 290, 284; 363/50, 52, 53

(56) References Cited

U.S. PATENT DOCUMENTS

| | | | |
|---|---|---|---|
| 4,931,716 | * 6/1990 | Jovanovic et al. | 323/285 |
| 4,959,764 | * 9/1990 | Basset | 323/224 |
| 5,066,900 | * 11/1991 | Bassett | 323/224 |
| 5,262,930 | * 11/1993 | Hua et al. | 323/282 |
| 5,418,704 | * 5/1995 | Hua et al. | 323/282 |
| 5,428,286 | * 6/1995 | Kha | 323/285 |
| 5,434,768 | * 7/1995 | Jitaru et al. | 363/21 |
| 5,477,131 | * 12/1995 | Gegner | 323/222 |
| 5,594,635 | * 1/1997 | Gegner | 363/124 |
| 5,736,842 | * 4/1998 | Jovanovic | 323/222 |
| 5,790,389 | * 8/1998 | Hua | 363/20 |
| 5,815,386 | * 9/1998 | Gordon | 363/50 |
| 5,999,419 | * 12/1999 | Marrero | 363/21 |

* cited by examiner

*Primary Examiner*—Peter S. Wong
*Assistant Examiner*—Bao Q. Vu

(57) ABSTRACT

For use with a power converter couplable to a source of electrical energy, the converter having a power switch that conducts intermittently to transfer energy from the source to an inductive element, and a freewheeling diode that alternately conducts with the power switch to transfer energy to an output of the converter, an active clamp and a method of operating the active clamp. In one embodiment, the active clamp includes: (1) an inductor, coupled in series with the freewheeling diode, and (2) a series-coupled capacitor and clamping switch, coupled in parallel with the inductor, that cooperate therewith to mitigate adverse effects of reverse recovery currents associated with the freewheeling diode and enable substantially zero voltage switching of the power and clamping switches.

20 Claims, 8 Drawing Sheets

ACTIVE CLAMP FOR POWER CONVERTER AND METHOD OF OPERATION THEREOF

TECHNICAL FIELD OF THE INVENTION

The present invention is directed, in general, to power conversion and, more specifically, to an active clamp for a power converter, a method of operating the active clamp and a power converter employing the active clamp or the method.

BACKGROUND OF THE INVENTION

A power converter is a power processing circuit that converts an input voltage or current waveform into a specified output voltage or current waveform. A switched-mode power converter is a frequently employed power converter that converts an input voltage waveform into a specified output voltage waveform. A buck converter is one example of a switched-mode power converter that is typically employed in applications wherein a stable, regulated voltage is desired at the output of the power converter.

A non-isolated buck converter generally includes a power switch couplable to a source of input voltage. The power switch intermittently switches to provide an output voltage to a load couplable to an output of the buck converter. A controller regulates the output voltage by varying a duty cycle of the power switch. Depending on the duty cycle of the power switch, the output voltage may be regulated to any desired voltage between zero and the input voltage.

The controller typically switches the power switch at a high switching frequency, such as one beyond the audible range, to reduce the size and weight of inductive components employed and, therefore, to reduce the cost, as well as the size and weight, of the buck converter. Conventional buck converters, therefore, typically include a low pass output filter having a filter inductor and a filter capacitor. The corner frequency of the output filter may be set sufficiently lower than the switching frequency of the power switch to minimize the output ripple.

Since the power switch is coupled in series with the filter inductor, turning off the power switch may result in a high voltage thereacross unless an alternative path is provided for the inductor current. A freewheeling diode may, therefore, be coupled between common and a node between the power switch and the filter inductor to provide a path for the inductor current while the power switch is off. During a conduction interval of the power switch, the freewheeling diode is reversed biased. Then, during a non-conduction interval of the power switch, the inductor current flows through the freewheeling diode, transferring some of its stored energy to the load. The buck converter, like other switched-mode power converters, preferably includes at least two semiconductor switches, the power switch and the freewheeling diode.

Analogous to other types of power converters (e.g., a boost converter), the buck converter is subject to inefficiencies that impair its overall performance. More specifically, the power switch and freewheeling diode may be subject to conduction losses that reduce the efficiency of the converter. Additionally, the power switch [e.g., a metal-oxide semiconductor field-effect transistor (MOSFET)] is subject to switching losses that occur, in part, when a charge built-up in a parasitic capacitance of the power switch is dissipated during turn-on. Furthermore, the freewheeling diode may also be subject to a reverse recovery condition (when the power switch is turned on) that induces a substantial current spike through both the power switch and the freewheeling diode. The losses associated with the power switch and the freewheeling diode increase linearly as the switching frequency of the converter is increased. Therefore, minimizing the reverse recovery and switching losses associated with the freewheeling diode and power switch will improve the overall efficiency of the converter.

Accordingly, what is needed in the art is an active clamp, employable with a variety of power converter topologies, that reduces the losses associated with the reverse recovery condition and further reduces the switching losses associated with the power switch of a power converter.

SUMMARY OF THE INVENTION

To address the above-discussed deficiencies of the prior art, the present invention provides, for use with a power converter couplable to a source of electrical energy, the converter having a power switch that conducts intermittently to transfer energy from the source to an inductive element, and a freewheeling diode that alternately conducts with the power switch to transfer energy to an output of the converter, an active clamp and a method of operating the active clamp. In one embodiment, the active clamp includes: (1) an inductor, coupled in series with the freewheeling diode, and (2) a series-coupled capacitor and clamping switch, coupled in parallel with the inductor, that cooperate therewith to mitigate adverse effects of reverse recovery currents associated with the freewheeling diode and enable substantially zero voltage switching of the power and clamping switches.

The present invention, in one aspect, introduces the broad concept of an active clamp employable with switched-mode power converter topologies having a freewheeling diode subject to reverse recovery currents. The active clamp is capable of reducing the reverse recovery losses associated with the freewheeling diode and is further capable of reducing the switching losses associated with the power switch of the power converter.

In one embodiment of the present invention, the clamping switch conducts to couple the capacitor across the inductor, thereby enabling the capacitor to discharge through the inductor. Consequently, the amount of energy stored in the capacitor is sufficient to enable substantially zero voltage switching of the power and clamping switches.

In an embodiment to be illustrated and described, the clamping switch is a metal oxide semiconductor field-effect transistor (MOSFET). Those skilled in the pertinent art will understand, however, that the present invention fully encompasses all controllable switches, whether conventional or later-developed. In a related embodiment, the freewheeling diode and a body diode of the clamping switch are similarly oriented. Of course, an external diode may be employed as required.

In one embodiment of the present invention, the converter is selected from the group consisting of a non-isolated boost converter, a non-isolated buck converter, a non-isolated buck-boost converter, a non-isolated capacitive-coupled buck-boost converter, a non-isolated Sepic converter, and a non-isolated Zeta converter. Those skilled in the pertinent art understand, however, that other converter topologies are well within the broad scope of the present invention.

In one embodiment of the present invention, the converter further includes a controller coupled to the power and clamping switches. The controller controls conduction intervals of the power and clamping switches. In an embodiment to be illustrated and described, the controller monitors the output voltage of the converter and controls the power and clamping switches in response thereto. Of course, those skilled in the pertinent art understand that other control points within the converter, or power supply as a whole, are within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
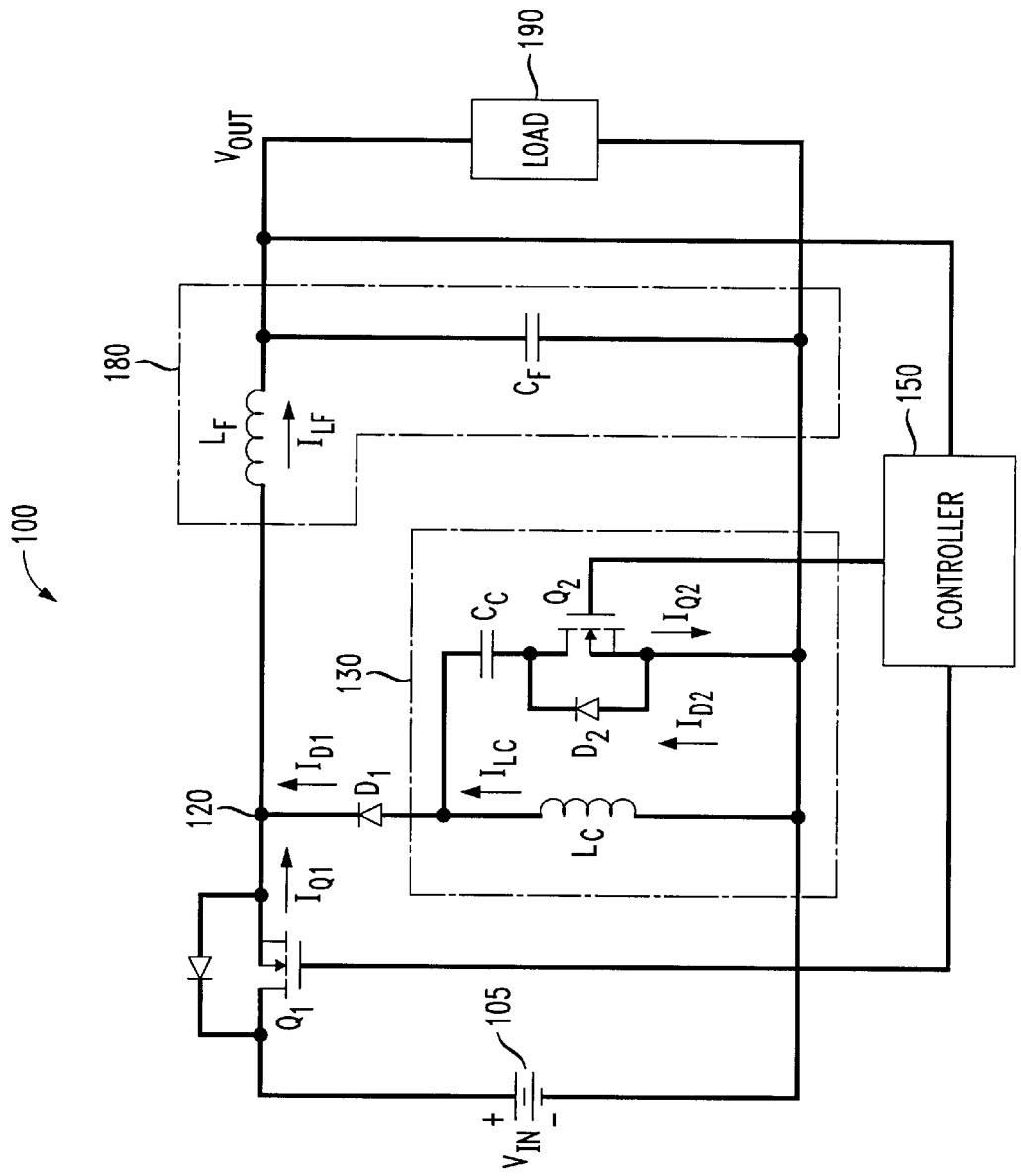
FIG. 1 illustrates a schematic diagram of an embodiment of a non-isolated buck converter constructed in accordance with the principles of the present invention.

Referring initially to FIG. 1, illustrated is a schematic diagram of an embodiment of a non-isolated buck converter 100 constructed in accordance with the principles of the present invention. The buck converter 100 has an input couplable to a source of electrical power 105 having an input voltage $V_{IN}$ and an output couplable to a load 190. The buck converter 100 includes a power switch $Q_1$ coupled to the input. In the illustrated embodiment, the power switch $Q_1$ is a metal oxide semiconductor field-effect transistor (MOSFET). Of course, other controllable switches, such as bipolar junction transistors (BJTs), insulated gate bipolar transistors (IGBTs) and gate turn-off thyristors (GTOs) are well within the broad scope of the present invention.

The buck converter 100 further includes an output filter 180 having a filter inductor (inductive element) $L_F$ and a filter capacitor $C_F$. In the illustrated embodiment, the output filter 180 is a low pass filter having a corner frequency set sufficiently lower than the switching frequency of the power switch $Q_1$ to minimize ripple in an output voltage $V_{OUT}$. The buck converter 100 further includes a freewheeling diode $D_1$ coupled to a node 120 between the power switch $Q_1$ and the filter inductor $L_F$.

The buck converter 100 further includes an active clamp 130 coupled to the freewheeling diode $D_1$. The active clamp 130 includes an inductor (clamping inductor $L_C$) coupled in series with the freewheeling diode $D_1$. The active clamp 130 further includes a series-coupled capacitor (clamping capacitor $C_C$) and clamping switch $Q_2$ coupled in parallel with the clamping inductor $L_C$. In the illustrated embodiment, the clamping switch $Q_2$ is a MOSFET having a body diode $D_2$. The clamping switch $Q_2$ may be positioned such that the body diode $D_2$ is similarly oriented with respect to the freewheeling diode $D_1$. While the body diode $D_2$ is integral to the clamping switch $Q_2$ and is explicitly illustrated only to show its orientation, an external diode may be employed as required to supplement the body diode $D_2$. Those skilled in the pertinent art will realize that, while the power switch $Q_1$ and the clamping switch $Q_2$ are illustrated as MOSFETs, the use of any conventional or later-developed controllable switch is well within the broad scope of the present invention.

The buck converter 100 still further includes a controller 150, coupled to the power and clamping switches $Q_1$, $Q_2$, that controls conduction intervals of the power and clamping switches $Q_1$, $Q_2$. In the illustrated embodiment, the controller 150 monitors the output voltage $V_{OUT}$, and controls the power and clamping switches $Q_1$, $Q_2$ to regulate the output voltage $V_{OUT}$ of the buck converter 100. Of course, the controller 150 may monitor other control points within the buck converter 100 as desired.

Figure 2:
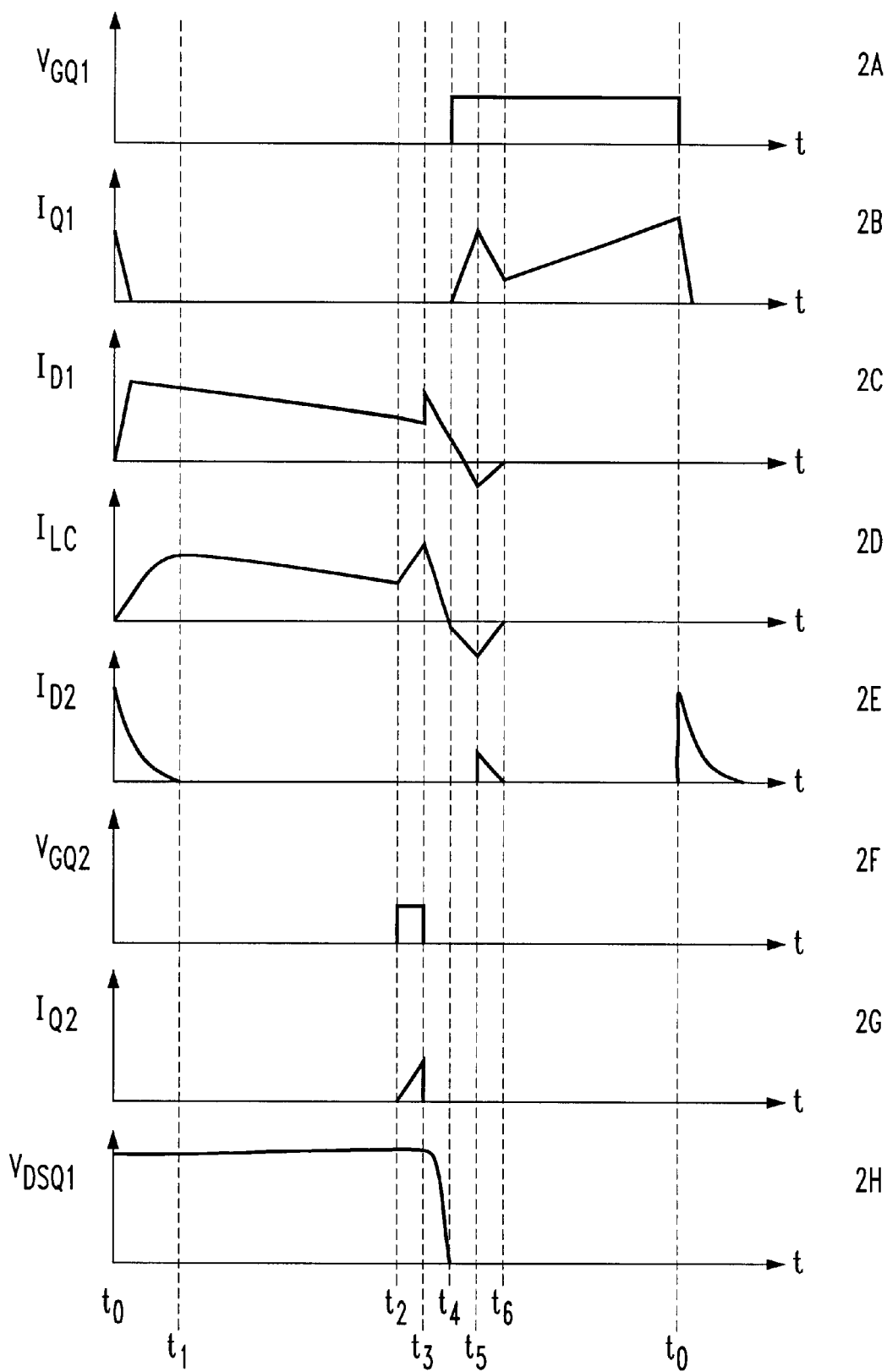
FIG. 2A through 2H illustrate graphical representations of a plurality of current and voltage waveforms of the non-isolated buck converter of FIG. 1.

Turning now to FIGS. 2A through 2H, illustrated are graphical representations of a plurality of current and voltage waveforms of the buck converter 100 of FIG. 1. More specifically, FIG. 2A illustrates a gate voltage $V_{GQ1}$ of the power switch $Q_1$. As illustrated, the power switch $Q_1$ is conducting during a primary interval D ($t_4$–$t_0$) and is non-conducting during a complementary interval 1–D ($t_0$–$t_4$). FIG. 2B illustrates a drain current $I_{Q1}$ through the power switch $Q_1$. FIG. 2C illustrates a freewheeling current $I_{D1}$ through the freewheeling diode $D_1$. FIG. 2D illustrates a clamping inductor current $I_{LC}$ through the clamping inductor $L_C$. FIG. 2E illustrates a body diode current $I_{D2}$ through the body diode $D_2$ of the clamping switch $Q_2$. FIG. 2F illustrates a gate voltage $V_{GQ2}$ of the clamping switch $Q_C$. FIG. 2G illustrates a drain current $I_{Q2}$ through the clamping switch $Q_2$. FIG. 2H illustrates a drain-source voltage $V_{DSQ1}$ across the power switch $Q_1$.

With continuing reference to FIG. 1, the buck converter 100 operates as follows. The power switch $Q_1$ is conducting during the primary interval D ($t_4$–$t_0$; see FIG. 2A) to transfer a portion of the electrical power from the source 105 to the filter inductor $L_F$ and to the load 190. During the primary interval D, the drain current $I_{Q1}$ flows through power switch $Q_1$, and the filter inductor $L_F$ (see FIG. 2B). The freewheeling diode $D_1$ is reverse biased (see FIG. 2C) and there is negligible clamping inductor current flow through the clamping inductor $L_{CLAMP}$ (see FIG. 2D).

The power switch $Q_1$ is then turned off at the end of the primary interval D (at $t_0$; see FIG. 2A). An inductor current $I_{LF}$ (through the filter inductor $L_F$) established by the conduction of the power switch $Q_1$ during the primary interval D initially (at $t_0$) flows to the output through the body diode $D_2$ of the clamping switch $Q_2$ (see FIG. 2E), the clamping capacitor $C_C$ and the freewheeling diode $D_1$ (see FIG. 2C).

As the inductor current $I_{LF}$ flows through the clamping capacitor $C_C$, the clamping capacitor $C_C$ begins to charge and a clamping voltage is developed thereacross. Since the clamping capacitor $C_C$ and clamping switch $Q_2$ are coupled across the clamping inductor $L_C$, the clamping voltage is applied across the clamping inductor $L_C$, causing the clamping inductor current $I_{LC}$ (which is a portion of the inductor current $I_{LF}$) to begin to flow through the clamping inductor $L_C$ (see FIG. 2D). As the clamping capacitor $C_C$ continues to charge, the body diode current $I_{D2}$ through the body diode $D_2$ and clamping capacitor $C_C$ decreases (see FIG. 2E) while the clamping inductor current $I_{LC}$ increases (see FIG. 2D). Once the current through the clamping capacitor $C_C$ has decreased to zero, the clamping inductor current $I_{LC}$ will be equal to the inductor current $I_{LF}$ until the clamping switch $Q_2$ is turned on (at $t_2$). The clamping capacitor $C_C$ can now discharge through the clamping switch $Q_2$ and the clamping inductor $L_C$.

The clamping capacitor $C_C$ replenishes its charge at two distinct time intervals ($t_0$–$t_1$ and $t_5$–$t_6$) during a switching cycle. First, the clamping inductor current $I_{LC}$ may flow through the body diode $D_2$ of the clamping switch $Q_2$ to charge the clamping capacitor $C_C$ ($t_0$–$t_1$; see FIGS. 2D, 2E). Second, a reverse recovery current from the freewheeling diode $D_1$ may flow into the clamping inductor $L_C$ to store energy in the clamping inductor $L_C$. The energy stored in the clamping inductor $L_C$ may then be recovered into the clamping capacitor $C_C$ via the body diode $D_2$ once the freewheeling diode $D_1$ has completed the reverse recovery period ($t_5$–$t_6$).

The clamping switch $Q_2$ is turned on for a short interval ($t_2$–$t_3$) at the end of a complementary interval 1–D (see FIG. 2F). During this interval ($t_2$–$t_3$), the clamping voltage (available across the clamping capacitor $C_C$) is applied across the clamping inductor $L_C$ to cause the clamping inductor current $I_{LC}$ to ramp up above the inductor current $I_{LF}$ (see FIG. 2D). The clamping switch $Q_2$ is then turned off (at $t_3$). A difference in current between the clamping inductor current $I_{LC}$ and the inductor current $I_{LF}$ causes the voltage at the node 120 to rapidly increase until it is substantially equal to the input voltage $V_{IN}$. The drain source voltage $V_{DSQ1}$ across the power switch $Q_1$ decreases rapidly to substantially zero ($t_3$–$t_4$; see FIG. 2H). The power switch $Q_1$, may now be turned on with substantially zero volts thereacross to initiate the primary interval D (at $t_4$; see FIG. 2H). Conventionally, the conduction of the power switch $Q_1$ would cause the freewheeling diode $D_1$ to exhibit reverse recovery currents for a short time (during $t_4$–$t_5$) as current from the source 105 flows in a reverse direction through the freewheeling diode $D_1$. The present invention, in an advantageous embodiment, positions the clamping inductor $L_C$ in series with the freewheeling diode $D_1$ such that the clamping inductor $L_C$ effectively restricts the reverse recovery current, thus reducing energy losses due to the reverse recovery condition.

Figure 3:
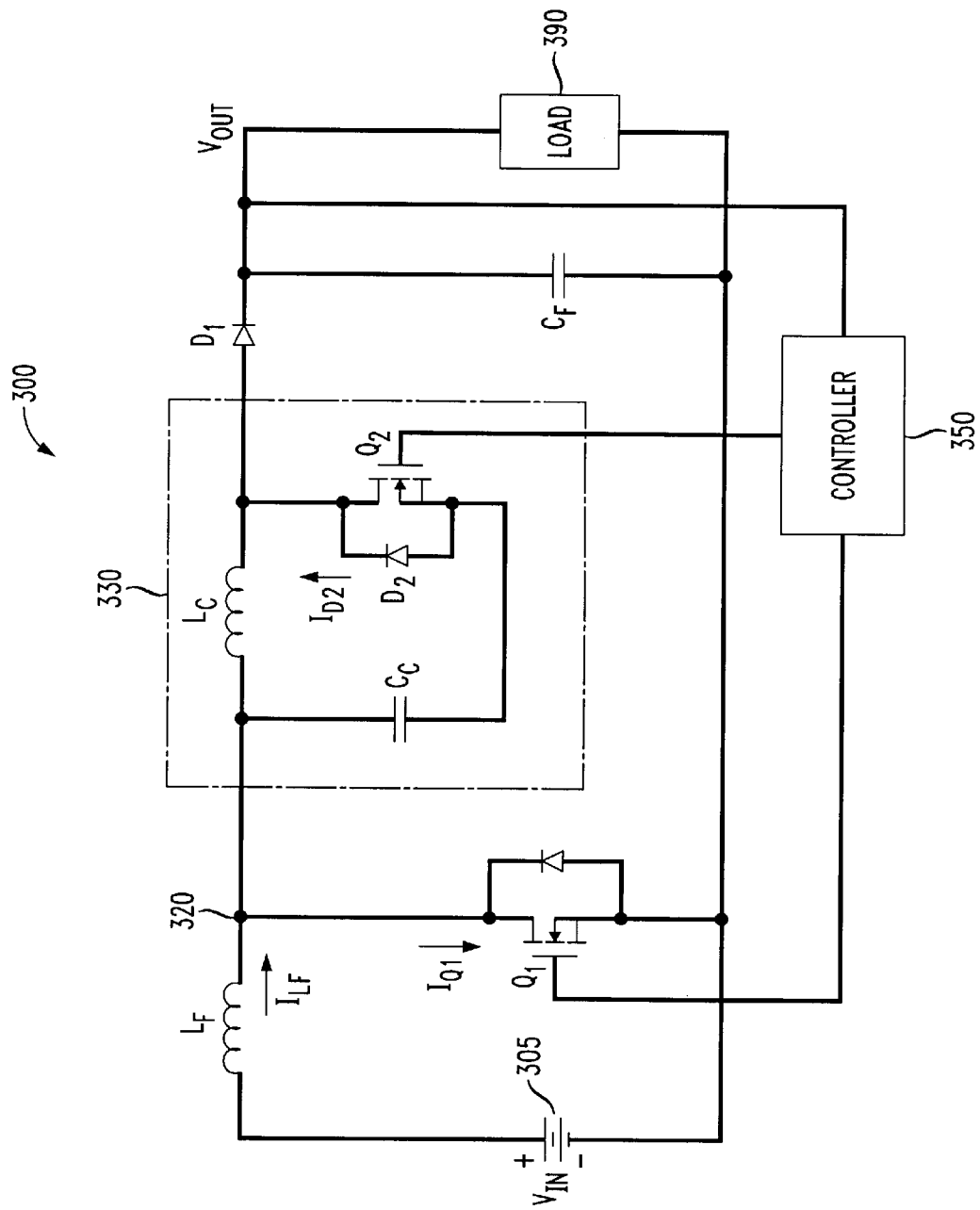
FIG. 3 illustrates a schematic diagram of an embodiment of a non-isolated boost converter constructed in accordance with the principles of the present invention.

Turning now to FIG. 3, illustrated is a schematic diagram of an embodiment of a non-isolated boost converter 300 constructed in accordance with the principles of the present invention. The boost converter 300 has an input couplable to a source of electrical power 305 having an input voltage $V_{IN}$ and an output couplable to a load 390. The boost converter 300 includes a filter inductor $L_F$ coupled to the input. The boost converter 300 further includes a power switch $Q_1$ coupled to the filter inductor $L_F$. The boost converter 300 further includes a freewheeling diode $D_1$ coupled to a node 320 between the filter inductor $L_F$ and the power switch $Q_1$. The boost converter 300 further includes a filter capacitor $C_F$ coupled across the output. The filter capacitor $C_F$ is preferably large to maintain an output voltage $V_{OUT}$ at a substantially constant level.

The boost converter 300 further includes an active clamp 330 coupled between the freewheeling diode $D_1$ and the node 320. In the illustrated embodiment, the active clamp 330 includes a clamping inductor $L_C$ coupled in series with the freewheeling diode $D_1$. The active clamp 330 further includes a series-coupled clamping capacitor $C_C$ and clamping switch $Q_2$ coupled in parallel with the clamping inductor $L_C$. In the illustrated embodiment, the clamping switch $Q_2$ is a MOSFET having an integral body diode $D_2$. The body diode $D_2$ is explicitly illustrated to indicate that its orientation is similar to that of the freewheeling diode $D_1$. Those skilled in the pertinent art realize that, while the illustrated body diode $D_2$ is integral to the clamping switch $Q_2$, an external diode may be employed as required to supplement the body diode $D_2$. Those skilled in the pertinent art also realize that the power switch $Q_1$ and the clamping switch $Q_2$ may be any controllable switch, whether conventional or later-developed.

The boost converter 300 still further includes a controller 350, coupled to the power switch $Q_1$ and the clamping switch $Q_2$, that controls conduction intervals of the power and clamping switches $Q_1$, $Q_2$. In the illustrated embodiment, the controller 350 monitors the output voltage $V_{OUT}$ and controls the power and clamping switches $Q_1$, $Q_2$ to regulate the output voltage $V_{OUT}$ of the boost converter 300. Of course, the controller 350 may monitor other control points within the boost converter 300 (e.g., an input current or an output current) as desired.

The boost converter 300 operates as follows. During a primary interval D, the input voltage $V_{IN}$ supplies energy via the power switch $Q_1$ to charge the filter inductor $L_F$. A filter inductor current $I_{LF}$ flows through the filter inductor $L_F$ and the power switch $Q_1$. The freewheeling diode $D_1$ is reverse biased, decoupling the filter capacitor $C_F$ and the load 390 from the source 305. During the primary interval D, a stored charge in the filter capacitor $C_F$ provides the output voltage $V_{OUT}$ to the load 390.

The power switch $Q_1$ then turns off at the end of the primary interval D. A voltage across the filter inductor $L_F$ reverses while the filter inductor current $I_{LF}$ maintains its direction of flow. The voltage at the node 320 increases, causing the filter inductor current $I_{LF}$ to initially flow through the clamping capacitor $C_C$ and the body diode $D_2$ to the output of the boost converter 300.

As the filter inductor current $I_{LF}$ flows through the clamping capacitor $C_C$, the clamping capacitor $C_C$ begins to charge and a clamping voltage is developed thereacross. Since the clamping capacitor $C_C$ and clamping switch $Q_2$ are coupled across the clamping inductor $L_C$, the clamping voltage is applied across the clamping inductor $L_C$, causing a portion of the filter inductor current $I_{LF}$ to begin to flow through the clamping inductor $L_C$. Then, as the clamping capacitor $C_C$ continues to charge, a body diode current $I_{D2}$ through the body diode $D_2$ and the clamping capacitor $C_C$ decreases while a clamping inductor current $I_{LC}$ increases. Once the current through the clamping capacitor $C_C$ has decreased to zero, the clamping inductor current $I_{LC}$ will be equal to the filter inductor current $I_{LF}$ until the clamping switch $Q_2$ is turned on.

The clamping switch $Q_2$ is turned on for a short interval at the end of a complementary interval 1–D. During the complementary interval 1−D, the clamping voltage is applied across the clamping inductor $L_C$ to cause the clamping inductor current $I_{LC}$ to ramp up above the filter inductor current $I_{LF}$. The clamping switch $Q_2$ is then turned off. A difference between the filter inductor current $I_{LF}$ and the clamping inductor current $I_{LC}$ causes the voltage at the node 320 to rapidly decrease to common. The power switch $Q_1$ may now be turned on with substantially zero volts thereacross to initiate the primary interval D. Conventionally, the turn-on of the power switch $Q_1$ would cause the freewheeling diode $D_1$ to exhibit a reverse recovery condition for a short time. The present invention, in an advantageous embodiment, positions the clamping inductor $L_C$ in series with the freewheeling diode $D_1$ such that the clamping inductor current $I_{LC}$ through the clamping inductor $L_C$ effectively resists the current from the filter capacitor $C_F$ thus reducing energy losses due to reverse recovery.

Figure 4:
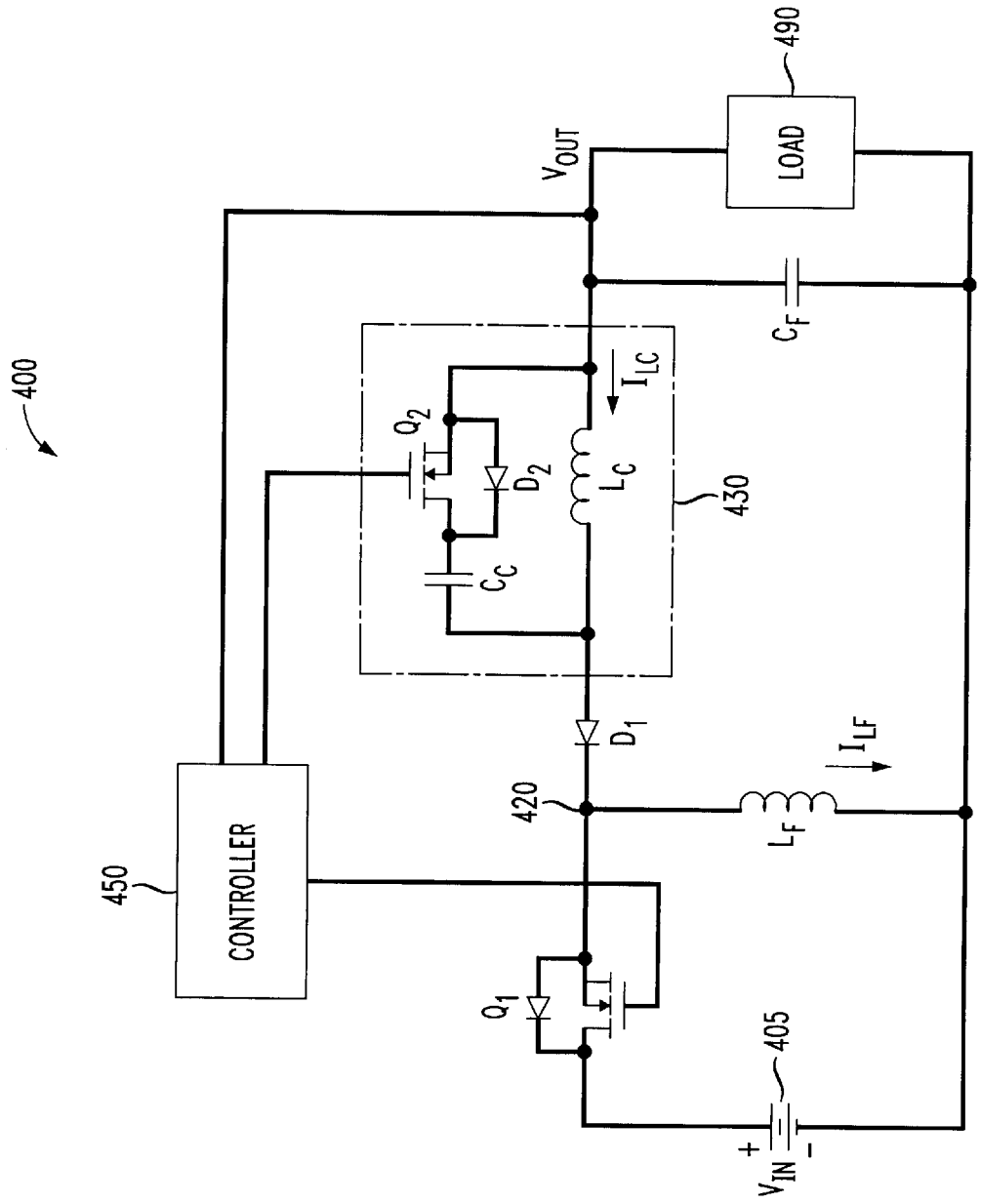
FIG. 4 illustrates a schematic diagram of an embodiment of a non-isolated buck-boost converter constructed in accordance with the principles of the present invention.

Turning now to FIG. 4, illustrated is a schematic diagram of an embodiment of a non-isolated buck-boost converter 400 constructed in accordance with the principles of the present invention. The buck-boost converter 400 has an input couplable to a source of electrical power 405 having an input voltage $V_{IN}$ and an output couplable to a load 490. The buck-boost converter 400 includes a power switch $Q_1$ coupled to the input. The buck-boost converter 400 further includes an inductor $L_F$ coupled between the power switch $Q_1$ and common. The buck-boost converter 400 further includes a freewheeling diode $D_1$ coupled to a node 420 between the power switch $Q_1$ and the inductor $L_F$. The buck-boost converter 400 further includes a filter capacitor $C_F$ coupled across the output. The filter capacitor $C_F$ is preferably large to maintain an output voltage $V_{OUT}$ at a substantially constant level.

The buck-boost converter 400 further includes an active clamp 430 coupled between the freewheeling diode $D_1$ and the filter capacitor $C_F$. In the illustrated embodiment, the active clamp 430 includes a clamping inductor $L_C$ coupled in series with the freewheeling diode $D_1$. The active clamp 430 further includes a series-coupled clamping capacitor $C_C$ and clamping switch $Q_2$ coupled in parallel with the clamping inductor $L_C$. In the illustrated embodiment, the power switch $Q_1$ and the clamping switch $Q_2$ are illustrated as MOSFETs. Those skilled in the pertinent art realize, of course, that both the power switch $Q_1$ and the clamping switch $Q_2$ may be any controllable switch, whether conventional or later-developed.

The buck-boost converter 400 still further includes a controller 450 coupled to the power switch $Q_1$ and the clamping switch $Q_2$. In the illustrated embodiment, the controller 450 monitors the output voltage $V_{OUT}$ and controls the power and clamping switches $Q_1$, $Q_2$ to regulate the output voltage $V_{OUT}$ of the buck-boost converter 400. While the illustrated controller 450 monitors the output voltage $V_{OUT}$, those skilled in the pertinent art realize that the controller 450 may monitor other control points within the buck-boost converter 400 (e.g., an input current or an output current) as desired.

The operation of the buck-boost converter 400 is analogous to the operation of the buck converter 100 of FIG. 1 and the boost converter 300 of FIG. 3 and, as a result, the operation thereof will only be briefly described.

During a primary interval D, the input voltage $V_{IN}$ supplies energy via the power switch $Q_1$ to charge the inductor $L_F$. An inductor current $I_{LF}$ flows through the power switch $Q_1$ and the inductor $L_F$. The freewheeling diode $D_1$ is reverse biased, decoupling the filter capacitor $C_F$ and the load 490 from the source 405. During the primary interval D, a stored charge in the filter capacitor $C_F$ provides the output voltage $V_{OUT}$ to the load 490.

The power switch $Q_1$ then turns off at the end of the primary interval D. The inductor current $I_{LF}$ established during the primary interval D initially flows to the output, through the clamping capacitor $C_C$, a body diode $D_2$ of the clamping switch $Q_2$ and the freewheeling diode $D_1$. As the inductor current $I_{LF}$ flows through the clamping capacitor $C_C$, the clamping capacitor $C_C$ begins to charge and a clamping voltage is developed thereacross. Since the clamping capacitor $C_C$ and clamping switch $Q_2$ are coupled across the clamping inductor $L_C$, the clamping voltage is applied across the clamping inductor $L_C$, causing a clamping inductor current $I_{LC}$ (which is a portion of the inductor current $I_{LF}$) to begin to flow through the clamping inductor $L_C$. Then, as the clamping capacitor $C_C$ continues to charge, a portion of the inductor current $I_{LF}$ flowing through the body diode $D_2$ and the clamping capacitor $C_C$ decreases while the clamping inductor current $I_{LC}$ increases. Once the portion of the inductor current $I_{LF}$ through the clamping capacitor $C_C$ has decreased to zero, a substantial portion of the inductor current $I_{LF}$ will flow through the clamping inductor $L_C$ until the clamping switch $Q_2$ is turned on.

The clamping switch $Q_2$ is turned on for a short interval at the end of a complementary interval 1−D to apply the clamping voltage across the clamping inductor $L_C$, causing the clamping inductor current $I_{LC}$ to ramp up above the inductor current $I_F$. The clamping switch $Q_2$ is then turned off. A difference between the inductor current $I_{LF}$ and the clamping inductor current $I_{LC}$ causes the voltage at the node 420 to rise rapidly to substantially the input voltage $V_{IN}$. The power switch $Q_1$ may now be turned on with substantially zero volts thereacross to initiate the primary interval D. Conventionally, the turn-on of the power switch $Q_1$ would cause the freewheeling diode $D_1$ to exhibit reverse recovery currents for a short time. The present invention, however, advantageously positions the clamping inductor $L_C$ in series with the freewheeling diode $D_1$ such that the clamping inductor current $I_{LC}$ through the clamping inductor $L_C$ effectively resists the current from the filter capacitor $C_F$ thus reducing energy losses due to reverse recovery.

In the illustrated embodiment, the filter capacitor $C_F$ is coupled across the output of the buck-boost converter 400. With the filter capacitor $C_F$ coupled as shown, the buck-boost converter 400 is operated with a discontinuous input current. While the discontinuous input current may be acceptable for a number of applications, some applications may be better served by a buck-boost converter operable with a continuous input current.

Figure 5:
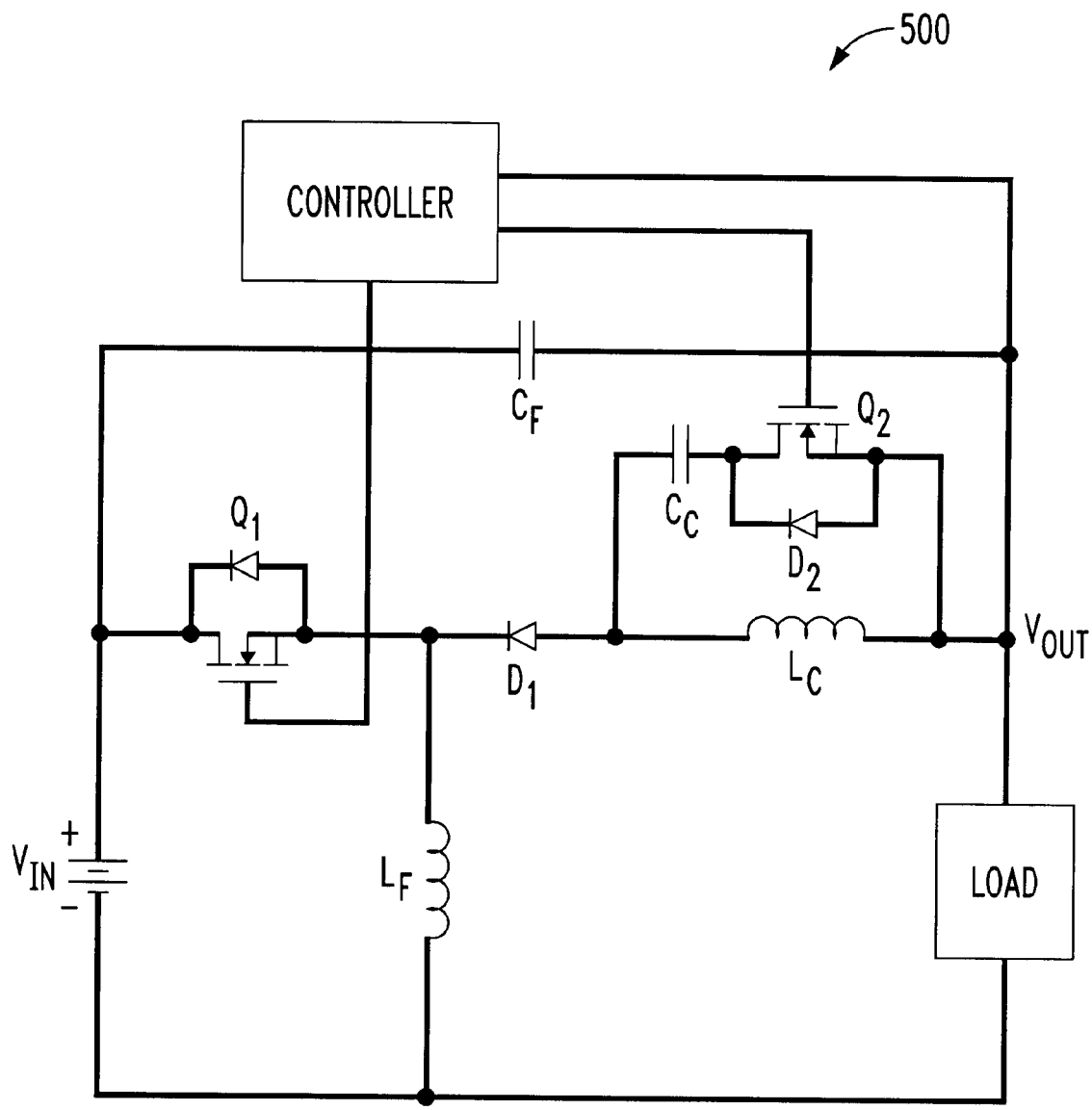
FIG. 5 illustrates a schematic diagram of another embodiment of a non-isolated buck-boost converter constructed in accordance with the principles of the present invention.

Turning now to FIG. 5, illustrated is a schematic diagram of another embodiment of a non-isolated buck-boost converter 500 constructed in accordance with the principles of the present invention. The buck-boost converter 500 is similar to the buck-boost converter 400 of FIG. 4 but includes a filter capacitor $C_F$, coupled between an input and an output of the buck-boost converter 500, to allow the buck-boost converter 500 to be operated with a continuous input current.

Figure 6:
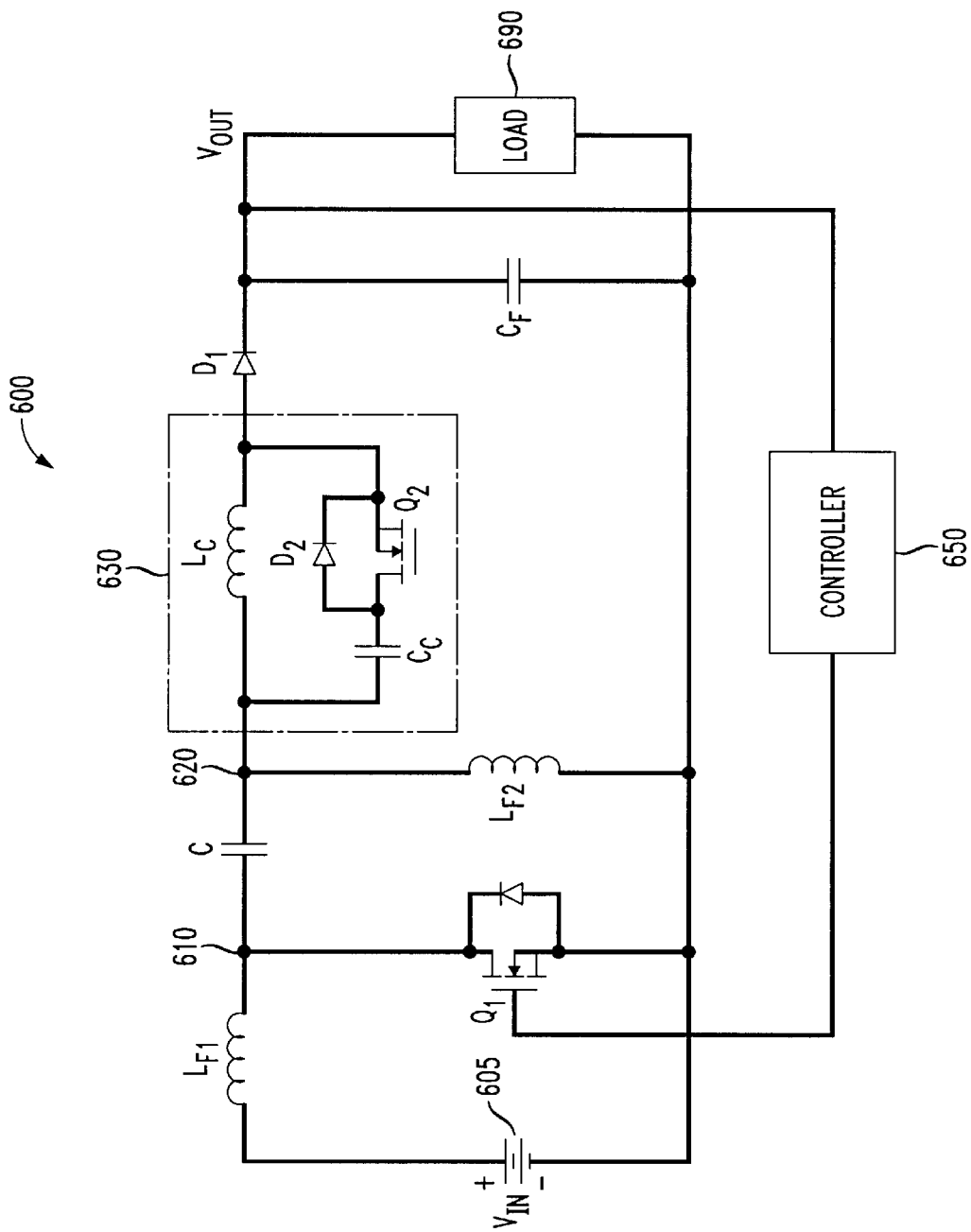
FIG. 6 illustrates a schematic diagram of an embodiment of a non-isolated Sepic converter constructed in accordance with the principles of the present invention.

Turning now to FIG. 6, illustrated is a schematic diagram of an embodiment of a non-isolated Sepic converter 600 constructed in accordance with the principles of the present invention. The Sepic converter 600 has an input couplable to a source of electrical power 605 having an input voltage $V_{IN}$ and an output couplable to a load 690. The Sepic converter 600 includes a first filter inductor $L_{F1}$ coupled to the input.

The Sepic converter 600 further includes a power switch $Q_1$ coupled to the first filter inductor $L_{F1}$. The Sepic converter 600 further includes a capacitor C coupled to a first node 610 between the power switch $Q_1$ and the first filter inductor $L_{F1}$. The Sepic converter 600 further includes a second filter inductor $L_{F2}$ coupled between the capacitor C and common. The Sepic converter 600 further includes a freewheeling diode $D_1$ coupled to a second node 620 between the capacitor C and the second filter inductor $L_{F2}$. The Sepic converter 600 further includes a filter capacitor $C_F$ coupled across the output.

The Sepic converter 600 further includes an active clamp 630 coupled between the freewheeling diode $D_1$ and the second node 620. In the illustrated embodiment, the active clamp 630 includes a clamping inductor $L_C$ coupled in series with the freewheeling diode $D_1$. The active clamp 630 further includes a series-coupled clamping capacitor $C_C$ and clamping switch $Q_2$ coupled in parallel with the clamping inductor $L_C$. The Sepic converter 600 still further includes a controller coupled to the power switch $Q_1$ and the clamping switch $Q_2$. In the illustrated embodiment, the controller 650 monitors the output voltage $V_{OUT}$ and controls the power and clamping switches $Q_1$, $Q_2$ to regulate the output voltage $V_{OUT}$ of the Sepic converter 600.

The operation of the Sepic converter 600 is analogous to the operation of the buck converter 100 of FIG. 1 and the boost converter 300 of FIG. 3 and, as a result, will not be described.

Figure 7:
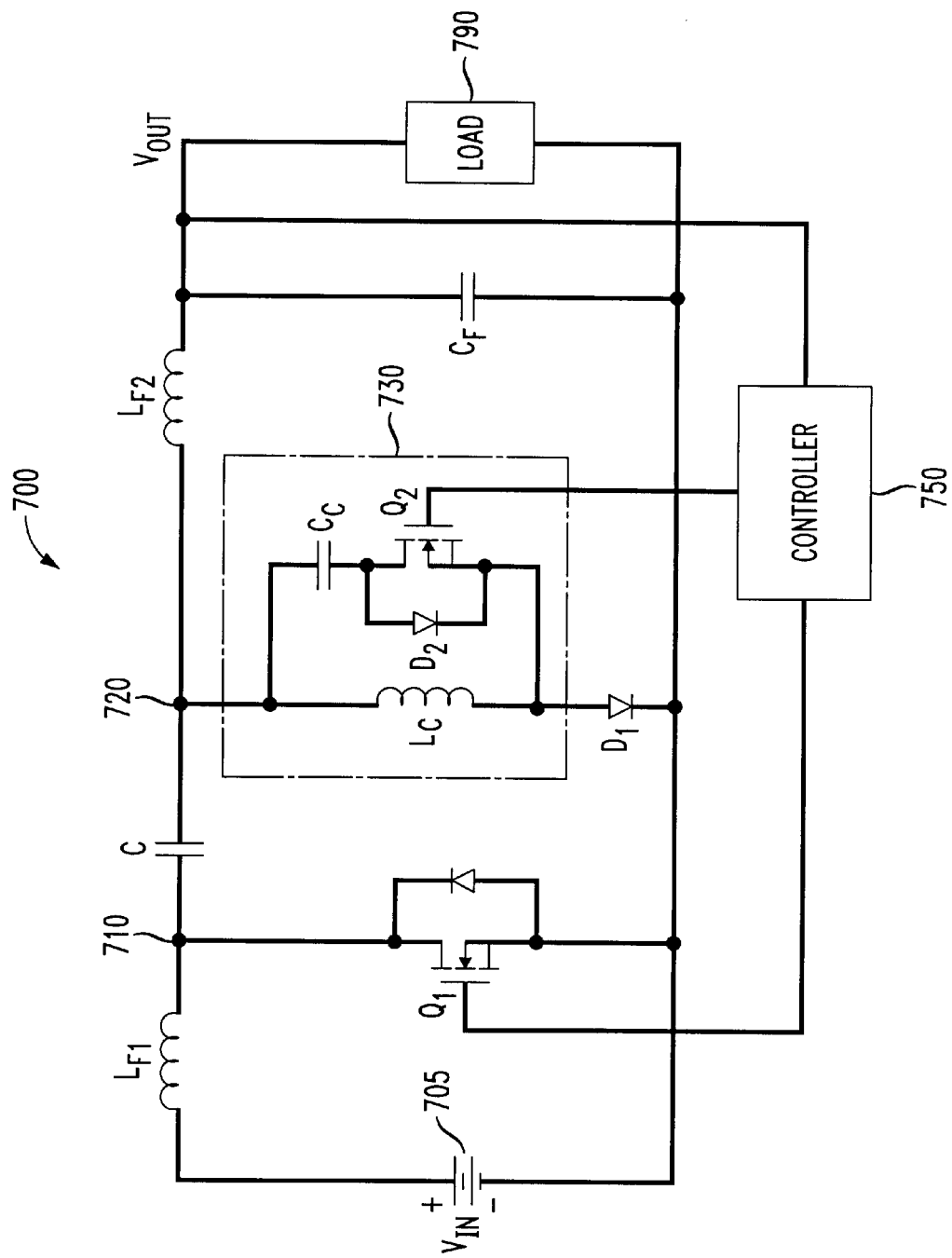
FIG. 7 illustrates a schematic diagram of an embodiment of a non-isolated capacitive-coupled buck-boost converter constructed in accordance with the principles of the present invention.

Turning now to FIG. 7, illustrated is a schematic diagram of an embodiment of a non-isolated capacitive-coupled buck-boost converter 700 constructed in accordance with the principles of the present invention. The converter 700 has an input couplable to a source of electrical power 705 having an input voltage $V_{IN}$ and an output couplable to a load 790. The converter 700 includes a first filter inductor $L_{F1}$ coupled to the input. The converter 700 further includes a power switch $Q_1$ coupled to the first filter inductor $L_{F1}$. The converter 700 further includes a capacitor C coupled to a first node 710 between the power switch $Q_1$ and the first filter inductor $L_{F1}$. The converter 700 further includes freewheeling diode $D_1$ coupled between the capacitor C and common. The converter 700 further includes a second filter inductor $L_{F2}$ coupled to the capacitor C. The converter 700 further includes a filter capacitor $C_F$ coupled across the output.

The converter 700 further includes an active clamp 730 coupled between the freewheeling diode $D_1$ and a second node 720 (between the capacitor C and the second filter inductor $L_{F2}$). In the illustrated embodiment, the active clamp 730 includes a clamping inductor $L_C$ coupled in series with the freewheeling diode $D_1$. The active clamp 730 further includes a series-coupled clamping capacitor $C_C$ and clamping switch $Q_2$ coupled in parallel with the clamping inductor $L_C$. The converter 700 still further includes a controller 750 coupled to the power switch $Q_1$ and the clamping switch $Q_2$. In the illustrated embodiment, the controller 750 monitors the output voltage $V_{OUT}$ and controls the power and clamping switches $Q_1$, $Q_2$ to regulate the output voltage $V_{OUT}$ of the converter 700.

The operation of the converter 700 is analogous to the operation of the buck converter 100 of FIG. 1 and the boost converter 300 of FIG. 3 and, as a result, will not be described.

Figure 8:
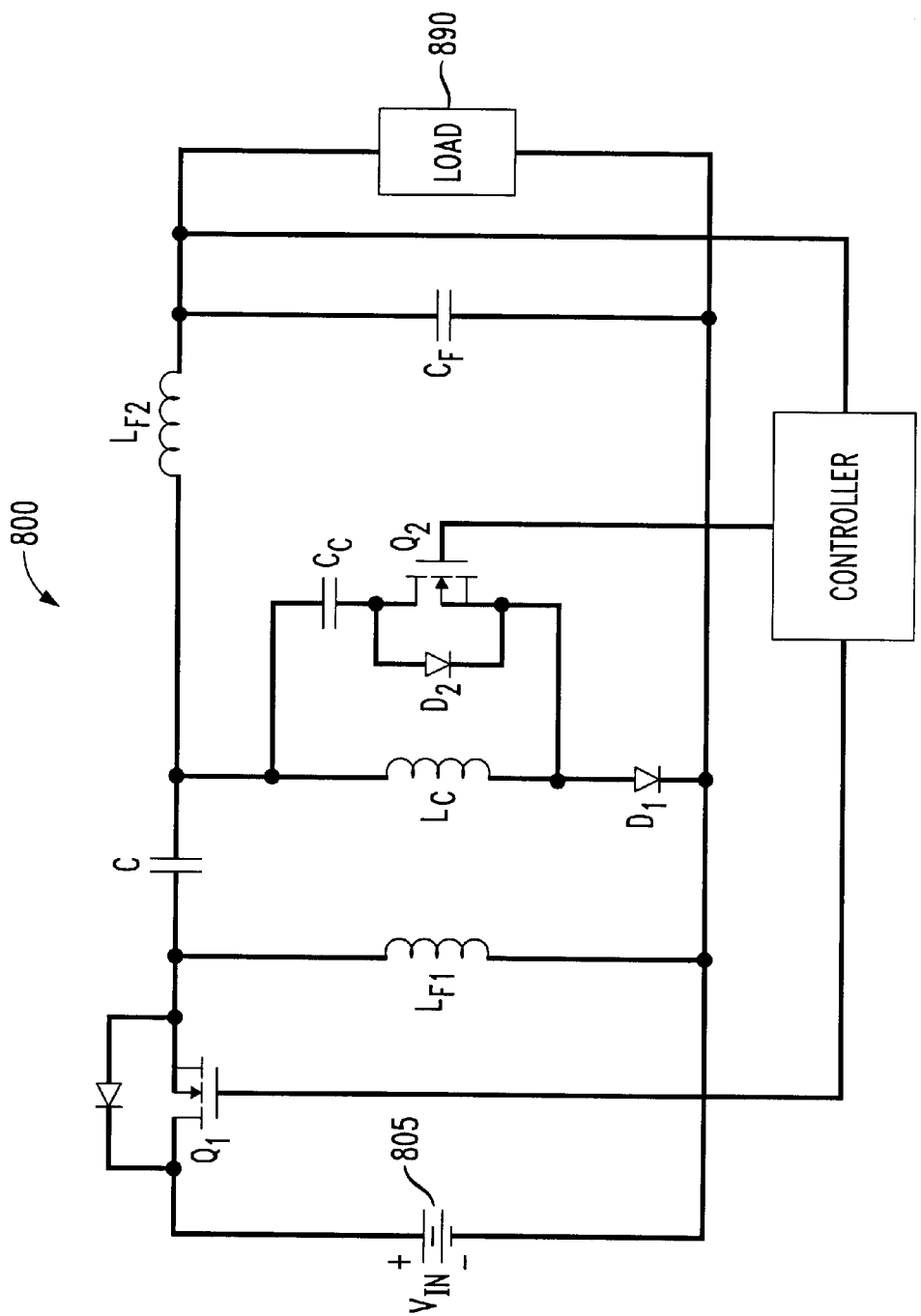
FIG. 8 illustrates a schematic diagram of an embodiment of a non-isolated Zeta converter constructed in accordance with the principles of the present invention.

Turning now to FIG. 8, illustrated is a schematic diagram of an embodiment of a non-isolated Zeta converter 800 constructed in accordance with the principles of the present invention. The Zeta converter 800 has an input couplable to a source of electrical power 805 having an input voltage $V_{IN}$ and an output couplable to a load 890. The Zeta converter 800 includes a power switch $Q_1$ coupled to the input. The Zeta converter 800 further includes a first filter inductor $L_{F1}$ coupled between the power switch $Q_1$ and common. The Zeta converter 800 further includes a capacitor C coupled to a first node 810 between the power switch $Q_1$ and the first filter inductor $L_{F1}$. The Zeta converter 800 further includes a freewheeling diode $D_1$ coupled to the capacitor C. The Zeta converter 800 further includes a second filter inductor $L_{F2}$ coupled to the capacitor C. The Zeta converter 800 further includes a filter capacitor $C_F$ coupled across the output.

The Zeta converter 800 further includes an active clamp 830 coupled between the freewheeling diode $D_1$ and a node 820 (between the capacitor C and the second filter inductor $L_{F2}$). In the illustrated embodiment, the active clamp 830 includes a clamping inductor $L_C$ coupled in series with the freewheeling diode $D_1$. The active clamp 830 further includes a series-coupled clamping capacitor $C_C$ and clamping switch $Q_2$ coupled in parallel with the clamping inductor $L_C$.

The Zeta converter 800 still further includes a controller 850 coupled to the power switch $Q_1$ and the clamping switch $Q_2$. In the illustrated embodiment, the controller 850 monitors the output voltage $V_{OUT}$ and controls the power and clamping switches $Q_1$, $Q_2$ to regulate the output voltage $V_{OUT}$ of the Zeta converter 800.

The operation of the Zeta converter 800 is analogous to the operation of the buck converter 100 of FIG. 1 and the boost converter 300 of FIG. 3 and, as a result, will not be described.

Those skilled in the art should understand that the previously described embodiments of the active clamp and power supply are submitted for illustrative purposes only and other embodiments of the active clamp capable of mitigating the adverse effects of reverse recovery currents in the freewheeling diode and enabling substantially zero voltage switching of the power and clamping switches are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

For a better understanding of power converters, see *Modern DC-to-DC Switchmode Power Converter Circuits*, by Rudolph P. Severns and Gordon Bloom, Van Nostrand Reinhold Company, New York, N.Y. (1985); and *Principles of Power Electronics*, by John G. Kassakian, Martin F. Schlect and George C. Verghese, Addison-Wesley Publishing Company, Reading, Mass. (1991). The above-listed references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a power converter couplable to a source of electrical energy, said power converter having a power switch that conducts intermittently to transfer energy from said source to an inductive element, and a freewheeling diode that alternately conducts with said power switch to transfer energy to an output of said power converter, an active clamp, comprising:

an inductor coupled in series with said freewheeling diode, a capacitor not directly coupled across said power switch, and a clamping switch series-coupled to said capacitor, said clamping switch and said capacitor coupled in parallel with said inductor and in series with said freewheeling diode, said active clamp mitigating adverse effects of reverse recovery currents associated with said freewheeling diode and enabling substantially zero voltage switching of said power and clamping switches.

2. The clamp as recited in claim 1 wherein said clamping switch conducts to couple said capacitor across said inductor thereby enabling said capacitor to discharge through said inductor.

3. The clamp as recited in claim 1 wherein said clamping switch is a metal oxide semiconductor field-effect transistor (MOSFET).

4. The clamp as recited in claim 3 wherein said freewheeling diode and a body diode of said clamping switch are similarly oriented.

5. The clamp as recited in claim 1 wherein said power converter is selected from the group consisting of:

a non-isolated boost converter, a non-isolated buck converter, a non-isolated buck-boost converter, a non-isolated capacitive-coupled buck-boost converter, a non-isolated Sepic converter, and a non-isolated Zeta converter.

6. The clamp as recited in claim 1 wherein said power converter further comprises a controller, coupled to said power and clamping switches, that controls conduction intervals of said power and clamping switches.

7. The clamp as recited in claim 6 wherein said controller monitors an output voltage of said power converter and controls said power and clamping switches in response thereto.

8. For use with a power converter couplable to a source of electrical energy, said power converter having a power switch that conducts intermittently to transfer energy from said source to an inductive element, and a freewheeling diode that alternately conducts with said power switch to transfer energy to an output of said power converter, a method of actively clamping energy of said power converter, comprising:

mitigating adverse effects of reverse recovery currents associated with said freewheeling diode with an active clamp having a series-coupled capacitor and clamping switch coupled in parallel with an inductor, said active clamp coupled in series with said freewheeling diode and said capacitor not directly coupled across said power switch; and enabling, with said active clamp, substantially zero voltage switching of said power and clamping switches.

9. The method as recited in claim 8 further comprising discharging said capacitor through said inductor.

10. The method as recited in claim 8 wherein said clamping switch is a metal oxide semiconductor field-effect transistor (MOSFET).

11. The method as recited in claim 10 wherein said freewheeling diode and a body diode of said clamping switch are similarly oriented.

12. The method as recited in claim 8 wherein said power converter is selected from the group consisting of:

a non-isolated boost converter, a non-isolated buck converter, a non-isolated buck-boost converter, a non-isolated capacitive-coupled buck-boost converter, a non-isolated Sepic converter, and a non-isolated Zeta converter.

13. The method as recited in claim 8 further comprising controlling conduction intervals of said power and clamping switches.

14. The method as recited in claim 13 wherein said controlling comprises monitoring an output voltage of said power converter and controlling said power and clamping switches in response thereto.

15. A power converter couplable to a source of electrical energy, comprising:

a power switch that conducts intermittently to transfer energy from said source to an inductive element, a freewheeling diode that alternately conducts with said power switch to transfer energy to an output of said power converter, an active clamp, including:

an inductor coupled in series with said freewheeling diode, a capacitor not directly coupled across said power switch, and a clamping switch series-coupled to said capacitor, said clamping switch and said capacitor coupled in parallel with said inductor and in series with said freewheeling diode, said active clamp mitigating adverse effects of reverse recovery currents associated with said freewheeling diode and enabling substantially zero voltage switching of said power and clamping switches, and a controller, coupled to said power and clamping switches, that controls conduction intervals of said power and clamping switches.

16. The power converter as recited in claim 15 wherein said clamping switch conducts to couple said capacitor across said inductor thereby enabling said capacitor to discharge through said inductor.

17. The power converter as recited in claim 15 wherein said clamping switch is a metal oxide semiconductor field-effect transistor (MOSFET).

18. The power converter as recited in claim 17 wherein said freewheeling diode and a body diode of said clamping switch are similarly oriented.

19. The power converter as recited in claim 15 wherein said power converter is selected from the group consisting of:

a non-isolated boost converter, a non-isolated buck converter, a non-isolated buck-boost converter, a non-isolated capacitive-coupled buck-boost converter, a non-isolated Sepic converter, and a non-isolated Zeta converter.

20. The power converter as recited in claim 15 wherein said controller monitors an output voltage of said converter and controls said power and clamping switches in response thereto.

* * * * *